Feb. 18, 1941.  C. SHUGG ET AL  2,232,484
ELECTRODE FOR ELECTROLYTIC DEVICES
Filed June 24, 1937  3 Sheets-Sheet 3
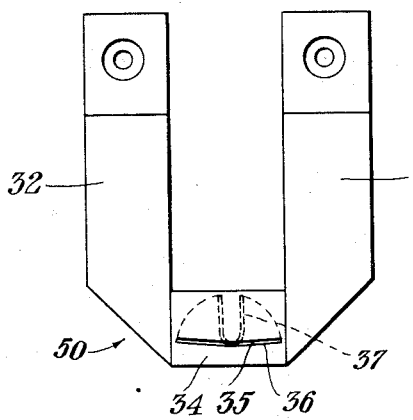
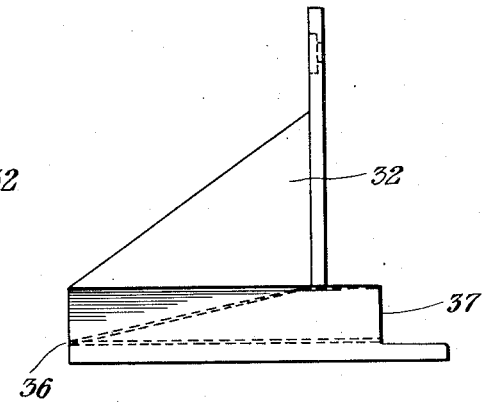
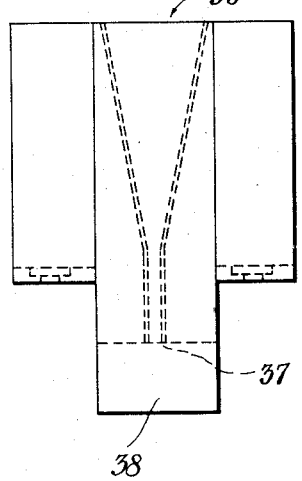
INVENTORS
CARLETON SHUGG & MAX KNAB
BY Dorsey, Cole & Garner
ATTORNEYS Patented Feb. 18, 1941

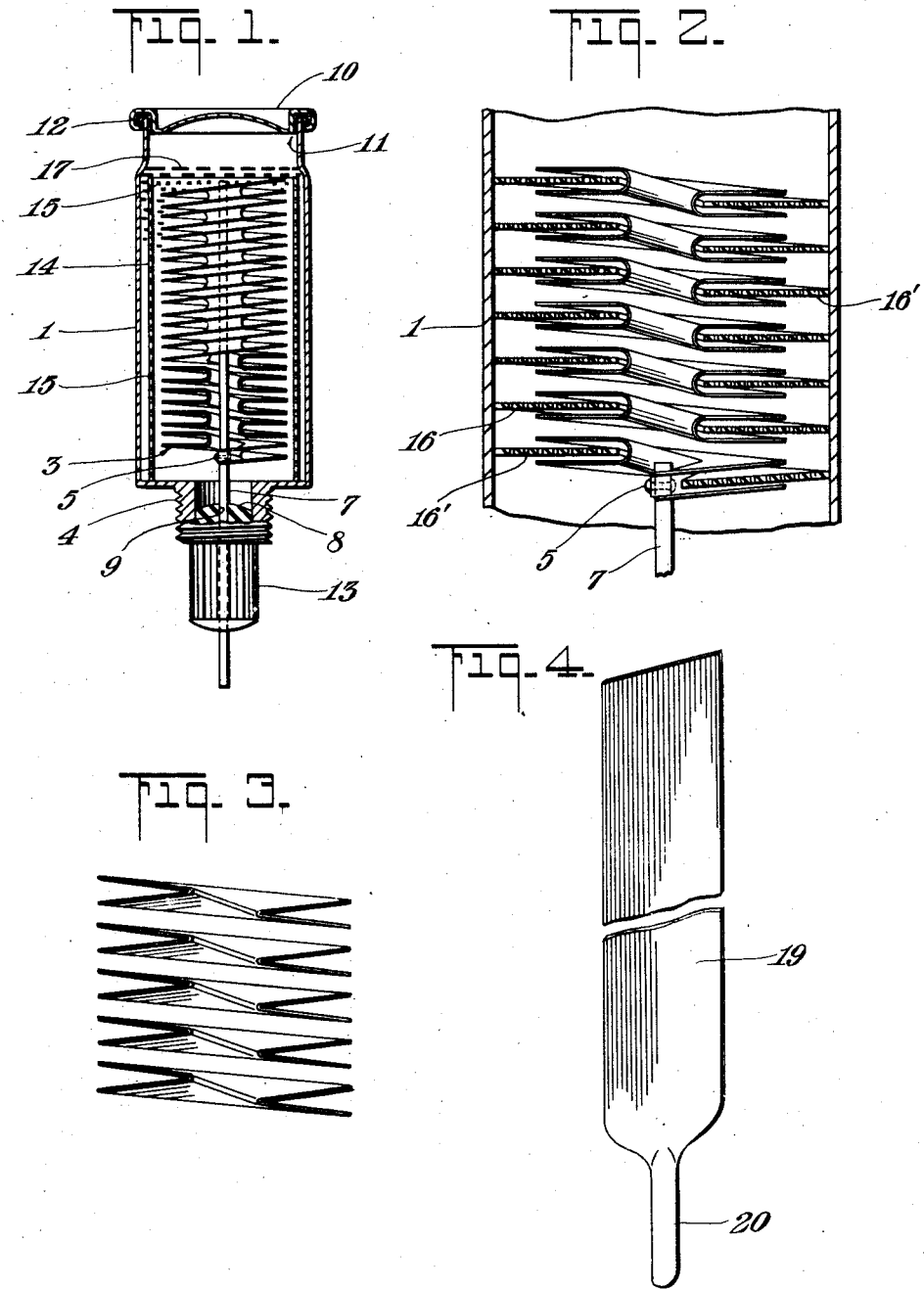

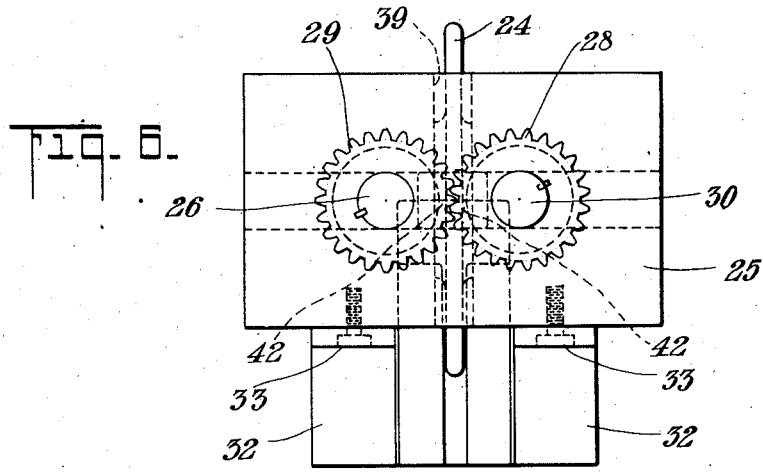
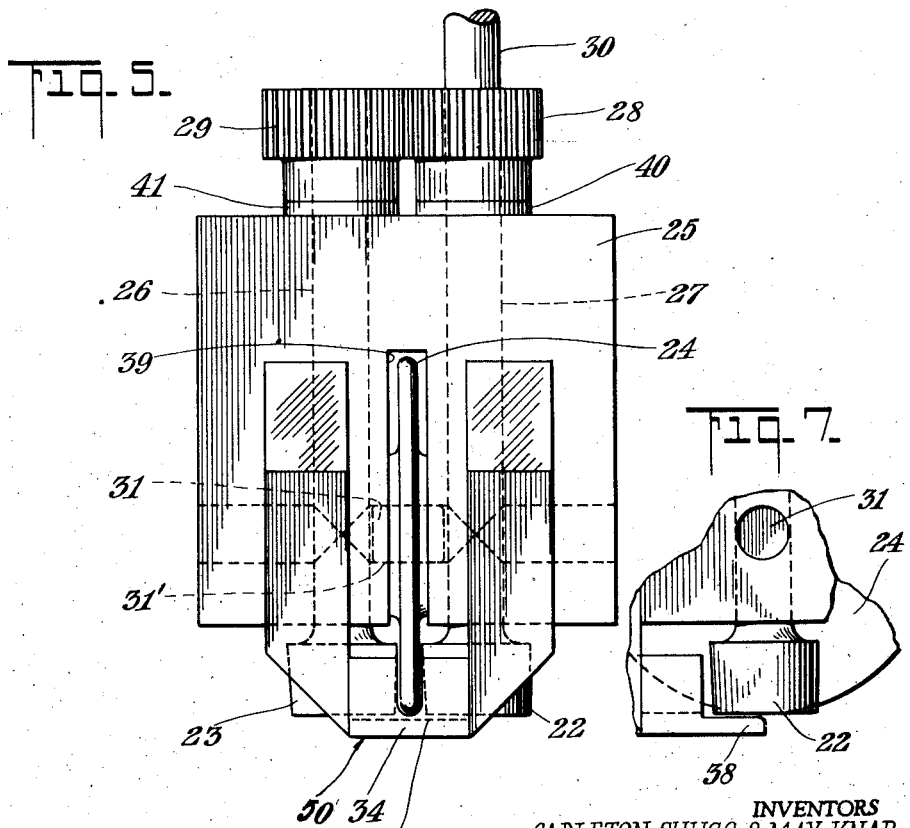

2,232,484

UNITED STATES PATENT OFFICE 2,232,484

ELECTRODE FOR ELECTROLYTIC DEVICES

Carleton Shugg, Stamford, Vt., and Max Knab, Brooklyn, N. Y., assignors to Sprague Specialties Company, North Adams, Mass., a corporation of Massachusetts Application June 24, 1937, Serial No. 150,170

5 Claims. (Cl. 175—315)

The present invention relates to electrolytic devices such as electrolytic condensers, rectifiers and the like having film-forming electrodes, and more particularly to a novel electrode construction for such electrolytic devices and the process of making the same.

We shall describe our invention in connection with electrolytic condensers for which it is of particular utility; however, it should be well understood that it is not limited to such.

Electrolytic condensers, as it is well known, comprise one or more electrodes of a metal exhibiting film-forming properties, for example of aluminum, and which are provided with a film which forms the dielectric of the condenser.

As the capacity of an electrolytic condenser is proportional to the area of the filmed electrode (anode), to obtain a high capacity in a small volume, it is desirable to have a compact anode with as large a surface area as possible.

The object of our invention is to provide a novel electrode construction having a very large effective surface area for a given volume.

Another object of our invention is to provide for an electrode which is easy to manufacture and assemble, and which while being of very thin material and thus very light, has so great inherent rigidity as to maintain its shape without requiring separate supports.

According to the invention, the above enumerated advantages are obtained by forming the electrode of a flat strip of foil folded into a U or V shape and subsequently winding the foil into a helix.

We are aware that it has been proposed to shape electrodes as flat helices, but past endeavors in using such electrodes have not been successful. This because if thin material was used the construction had insufficient rigidity, whereas with thick material the construction became too expensive. The present invention obviates these drawbacks.

In the drawings forming part of the specification:

Figure 1 is a cross-sectional elevation of an electrolytic condenser embodying the invention;

Fig. 2 is a fractional, enlarged cross-sectional view of an electrolytic condenser showing a somewhat modified embodiment of the invention;

Fig. 3 is an enlarged cross-sectional view of a portion of an electrode made in accordance with the invention;

Fig. 4 is a perspective view of a foil adapted to be formed into a helical electrode provided with an integral anode riser;

Fig. 5 is a front elevation of the apparatus for helically forming the electrode;

Fig. 6 is a top plan view of the apparatus of Fig. 5;

Fig. 7 is a side elevation of a portion of the apparatus of Fig. 5;

Fig. 8 is a front elevation of the fixture to fold the foil;

Fig. 9 is a bottom plan view of the fixture of Fig. 8;

Fig. 10 is a side view of the fixture of Fig. 9.

Referring to the drawings, the condenser shown in Fig. 1 comprises a metal container 1, preferably of cylindrical shape, and consisting of a suitable filming or non-filming metal, and which constitutes the cathode of the condenser. The container 1 has an enlarged neck portion shown at 4 which may be threaded for mounting the condenser on a suitable base.

The anode 3 consists of a ribbon of suitable filming metal, for example aluminum, magnesium, etc., shaped in accordance with the invention, being a double helix having a U or V shaped cross-section.

The anode 3 is secured to a riser 7 at a single point 6, the inherent rigidity of structure making it unnecessary to support the foil at both ends. The riser 7 may be of filming metal, as aluminum, or may be of an insulating material, resistant to the electrolyte, such as rubber or "Bakelite."

Disposed within the neck 4 is a plug 8 of soft rubber or similar resilient gasket-material, which is provided with a bore 9 through which snugly passes the end of anode riser 7. Proper air and liquid-tight sealing can be obtained by fluting the neck portion 13 of the container 1, as described in Patent #1,996,982 to R. C. Sprague et al.

If the riser 7 is made of insulating material proper electrical connection of the anode can be obtained by extending part of the metal foil along with the anode riser through the plug 8.

The top of the container 1 is provided with a crimped metal cap 10 which fits into the container 1 at 11. The free edge of the cap 10 together with a gasket 12 of wax-impregnated cloth or similar gasket material, is crimped over a rim provided on the free end of container 1.

The electrolyte 17 may be any electrolyte suitable for electrolytic condensers, for example a combination of a weak acid and a salt as borax and boric acid, and the viscosity of the electrolyte may vary within wide limits.

Interposed between the anode and the container is a spacer 14 of rubber, "Bakelite," Celluloid or other insulating material not attacked by the electrolyte. To insure free passage of the electrolyte between the cathode-container and the anode, the insulator 14 is preferably provided with suitable perforations 15.

A suitable spacer construction in accordance with the invention is shown in Fig. 2. The spacer 16 is of insulating material cut in the form of a helix which is interleaved with the anode. The spacer 16 may have an outside diameter substantially equal to the inside diameter of the cathode container so as to snugly fit into the container. It is preferably provided with comparatively large and numerous perforations 16' to provide for a satisfactory communication of the electrolyte between the anode portions.

The apparatus to make the electrodes of the invention is shown in Figs. 5 to 10. It comprises a supporting frame 25 which is rigidly mounted on a suitable base (not shown). Passing through the frame 25 and supported thereby are two spindle shafts 26 and 27, which carry suitably affixed driving gears 29 and 28 respectively. The driving gears 28 and 29 are identical in size and shape and are adapted through their engagement to rotate the spindle shafts 26 and 27 at equal and opposite speeds. In the arrangement shown shaft 26 is driven clockwise and shaft 27 is driven counterclockwise.

Thrust bearings 40 and 41 serve to reduce friction losses between the gears 29 and 28 and the frame 25.

The driving power may be supplied in any suitable manner, and applied for example through a suitable pulley or gear (not shown), which is attached to the extension 30 of the spindle shaft 27.

Affixed to the opposite ends of the spindle shafts and preferably formed as an integral part thereof, are forming rollers 22 and 23. These rollers are outwardly tapered, having thus their largest diameter at their end nearest to the frame 25.

Located within a slot 39 of the frame 25, between the forming rollers 22 and 23 and suitably spaced therefrom, is a forming wheel 24. The forming wheel 24 is mounted on a free running shaft 31 carried in bearings 31'—31' and is allowed free rotative motion therein.

The wheel 24 preferably has a large diameter as compared with the axial length of the rollers 22 and 23, for example a ratio of about 5 being quite suitable.

The forming rollers 22 and 23 and forming wheel 24 are made of suitable hardened material, for example high-tempered steel.

Mounted on the frame 25 by suitable mounting means, for example bolts 33, and with its longitudinal axis perpendicular to the axis of the shaft 31 of the forming wheel, is a foil-bending fixture 50, shown in detail in Figs. 7 to 10. The fixture 50 comprises two mounting brackets 32—32, a guide frame 34, a protruding arm foil guard 38, and a slot 35 which converges from the substantially rectangular shape shown at its entrance 36 to the desired U or V shape at its point of egress 37.

To form the helical electrode of the invention, a suitable metal foil, for example of aluminum, having a width twice that of the required depth of the helix, is threaded through the quasi-rectangular opening 36 of the guide structure 50 and pulled therethrough. The convergence of the guide slot 35 imparts to the flat foil the desired folded shape so that at the point of egress 37 it will have a V or U cross section depending on the shape of the slot.

From 37 the foil is led into the space formed by the tapered rollers 22 and 23 and the forming wheel 24, where the rotating rollers take hold of it and cause it to advance and to be distorted.

This distortion of the foil because of the tapered shape of the rollers is not equal along the entire depth of the foil, but those portions which contact with the larger diameter portion of the rollers 22 and 23 will be caused to compress and elongate more and consequently to be distorted to a greater area than the foil portions adjacent to the smaller diameter portions of the rollers. As a result the foil emerging from the space bounded by the rollers 22 and 23 and the wheel 24 will automatically form itself into a double helical shape.

The diameter of the helix depends on the degree of tapering imparted to the rollers 22 and 23, and the material and dimensions of the foil used.

The protruding arm 38 of the guide structure serves to prevent any displacement of the foil from between the rollers, during its contact with the rollers, whereas the forming wheel 24 serves to internally support the foil during this process.

For example if high-purity aluminum foil .75" wide and .014" thick is drawn through the guide slot 35 which imparts to it a U shape at the point of egress 37, the foil through its passage between rollers 22 and 23 which are .5" long and have maximum and minimum diameters of .683" and .667" respectively, will automatically wind itself into a helix having an outside diameter of 1.125."

It is to be noted that the width of the gap between the forming wheel 24 and the smallest diameter of the tapered rollers should equal the thickness of the foil. If the thickness of the foil is greater than this gap, unnecessarily high compression and distortion forces are required; whereas foils with a thickness less than that of the gap will not be compressed along the entire depth of the fold and therefore the helix will have a larger diameter than desired.

Various modifications of the invention may suggest themselves, for example the electrode support or riser may be formed as an integral part of the electrode. For such a construction a metal rod may be used which is flattened along that part of its length which is to form the effective portion of the electrode. The flattened portion 19 of such a rod, as shown in Figure 4, is then folded into a U or V shape and wound into a helix by the method of the invention, whereas the remaining portion 20 serves as the electrode riser and terminal connection.

While we have described our invention with specific examples and in specific embodiments, it should be well understood that we do not wish to be limited thereto, but desire the appended claims to be construed as broadly as permissible in view of the prior art.

What we claim is:

1. An anode for electrolytic devices comprising a flat, double helical coil of an aluminum ribbon, the individual turns of the ribbon having a substantially U-shaped section, the radial width of said ribbon being not less than one-third the outside diameter of said helical coil, and a support for said electrode being secured to said electrode at one point only.

2. An electrode for electrolytic condensers comprising a folded ribbon having a greater thickness at its fold than at its edges, said folded ribbon having the shape of a flat double helical coil the radial width of the folded ribbon being not less than one-third the outside diameter of the helical coil.

3. An electrode for electrolytic condensers comprising a folded ribbon of film-forming metal, said ribbon having a thickness uniformly increasing from the edges towards the fold, said folded ribbon forming a flat double helical coil the radial width of the folded ribbon being not less than one-third the outside diameter of the helical coil.

4. An electrode for electrolytic devices comprising a flat double helical coil consisting of a folded ribbon of filming metal, the radial width of the folded ribbon being not less than one-third the outside diameter of the helical coil.

5. An electrode for electrolytic devices comprising a flat double helical coil of a filming metal ribbon, the individual turns of said ribbon having a substantially U-shaped cross-section, the radial width of said ribbon being not less than one-third the outside diameter of the helical coil.

CARLETON SHUGG.
MAX KNAB.